(12) United States Patent
Welch et al.

(10) Patent No.: US 10,710,487 B2
(45) Date of Patent: Jul. 14, 2020

(54) SEATING CARGO RETENTION AND LOUNGING SYSTEM

(71) Applicant: Ford Global Technologies, LLC, Dearborn, MI (US)

(72) Inventors: Ryan Welch, Ottawa Lake, MI (US); Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 15/906,310

(22) Filed: Feb. 27, 2018

(65) Prior Publication Data

US 2019/0263306 A1   Aug. 29, 2019

(51) Int. Cl.
| | | |
|---|---|---|
| *B60N 3/00* | (2006.01) | |
| *A47C 17/80* | (2006.01) | |
| *A47C 17/84* | (2006.01) | |
| *A45F 3/22* | (2006.01) | |
| *B60N 2/12* | (2006.01) | |
| *B60N 2/02* | (2006.01) | |

(52) U.S. Cl.
CPC .............. *B60N 3/008* (2013.01); *A47C 17/80* (2013.01); *B60N 2/0292* (2013.01); *B60N 2/12* (2013.01); *A45F 3/22* (2013.01); *A47C 17/84* (2013.01)

(58) Field of Classification Search
CPC . A47C 17/80; A47C 17/84; B60P 3/38; B60P 3/39; B62D 33/0612; B60N 2/26; B60N 2/28; B60N 2/2839; B60N 2/3009; B60N 2/3011; B60N 2/3013; B60N 2/305; B60N 2/3097; B60N 2/015; B60N 2/01508; B60N 2/01516; B60N 2/0155; B60N 2/01583; B60N 3/008; A47D 1/10; A47D 1/103; A45F 3/22
USPC ........... 5/118, 94, 655, 652, 657; 297/219.1, 297/219.12, 250.1, 253–255; 296/65.01, 296/65.03, 65.05, 65.09
See application file for complete search history.

(56) References Cited

U.S. PATENT DOCUMENTS

| | | | |
|---|---|---|---|
| 2,163,198 A * | 6/1939 | Gossard .............. | B61D 33/005 297/245 |
| 2,260,584 A | 10/1941 | Schuck et al. | |
| 2,348,217 A | 5/1944 | Jones | |
| 2,556,076 A | 6/1951 | Evans et al. | |
| 2,601,488 A * | 6/1952 | Allen ..................... | B60N 2/345 5/94 |
| 2,688,998 A * | 9/1954 | Erickson et al. .... | B60N 2/6027 297/219.1 |
| 3,152,835 A * | 10/1964 | McKie .................... | A47C 7/52 297/423.1 |
| 3,449,012 A * | 6/1969 | Caron ................. | B60N 2/3011 297/403 |

(Continued)

*Primary Examiner* — Robert G Santos
(74) *Attorney, Agent, or Firm* — David Coppiellie; Price Heneveld LLP

(57) ABSTRACT

A vehicle interior system is provided herein. The vehicle interior system includes a seating assembly. The seating assembly includes a seatback that is pivotally coupled to a seat-base, and is operable between a use position and a stowed position. An anchoring feature is disposed vehicle rearward of the seating assembly. A hammock is coupled to the anchoring feature and is configured to extend therefrom and attach to the seating assembly when the seating assembly is in the stowed position.

19 Claims, 7 Drawing Sheets

(56) References Cited

U.S. PATENT DOCUMENTS

| | | | |
|---|---|---|---|
| 4,118,066 A * | 10/1978 | Ricke | B60J 11/025 |
| | | | 296/136.03 |
| 4,221,424 A | 9/1980 | Eiserman et al. | |
| 4,679,840 A | 7/1987 | Fry et al. | |
| 4,699,418 A * | 10/1987 | Plavetich | B60N 2/206 |
| | | | 296/65.09 |
| 5,170,521 A | 12/1992 | Light | |
| 5,593,208 A * | 1/1997 | Mitschelen | B60N 2/01583 |
| | | | 296/65.03 |
| 5,662,368 A * | 9/1997 | Ito | B60N 2/01583 |
| | | | 296/65.05 |
| 5,711,568 A | 1/1998 | Diem et al. | |
| 5,871,255 A * | 2/1999 | Harland | B60N 2/3011 |
| | | | 296/65.05 |
| 6,174,017 B1 * | 1/2001 | Salani | B60N 2/01583 |
| | | | 296/65.03 |
| 6,327,726 B1 * | 12/2001 | Weber | A47D 5/006 |
| | | | 5/655 |
| 6,631,946 B1 | 10/2003 | Neale | |
| 6,932,409 B2 * | 8/2005 | Falchero | B60N 2/3011 |
| | | | 296/65.01 |
| 7,523,888 B2 | 4/2009 | Ferry et al. | |
| 7,530,635 B2 * | 5/2009 | Schramek-Flye | A47D 1/103 |
| | | | 297/17 |
| 7,677,662 B2 | 3/2010 | Thompson | |
| 7,832,037 B2 | 11/2010 | Overton | |
| 9,101,203 B2 | 8/2015 | Ely | |
| 2005/0116493 A1 * | 6/2005 | Falchero | B60N 2/3011 |
| | | | 296/65.09 |
| 2008/0290707 A1 * | 11/2008 | Schramek-Flye | A47D 1/103 |
| | | | 297/255 |
| 2010/0050338 A1 * | 3/2010 | Overtone | B60N 3/001 |
| | | | 5/118 |
| 2019/0263306 A1 * | 8/2019 | Welch | B60N 2/345 |

\* cited by examiner

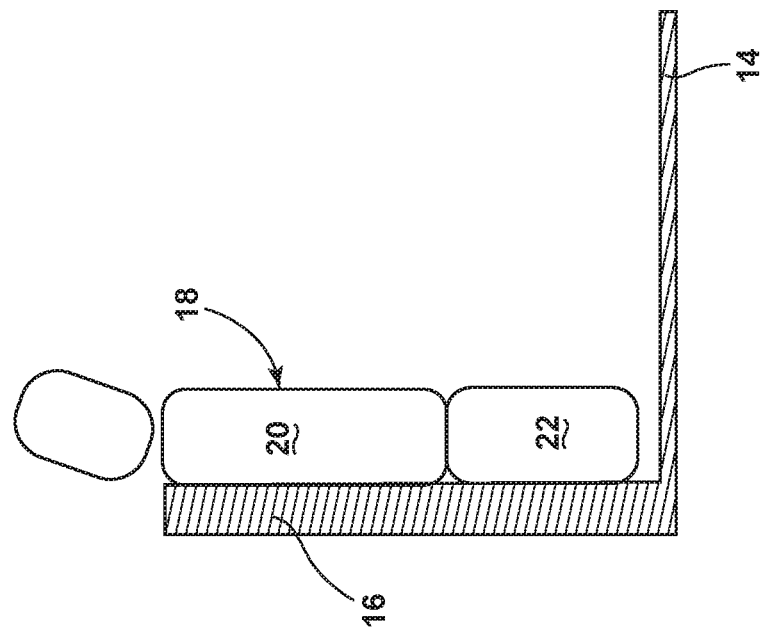
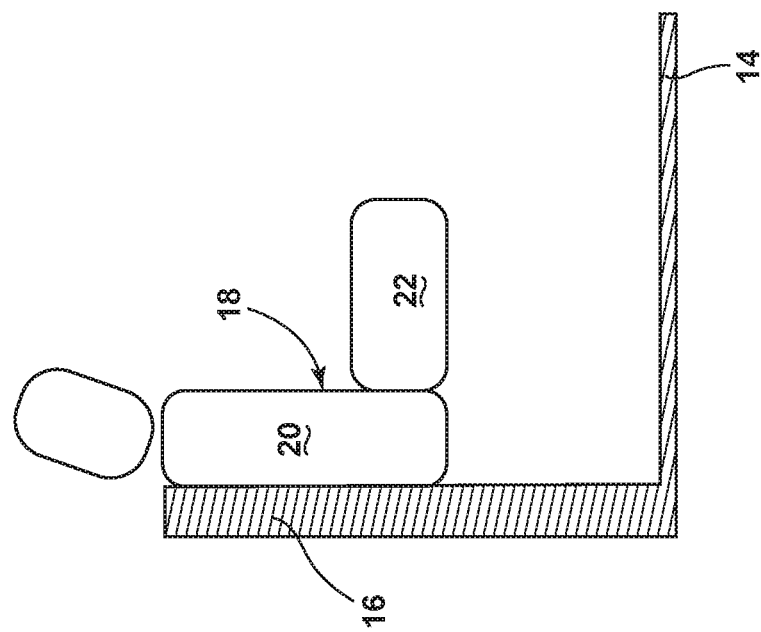

SEATING CARGO RETENTION AND LOUNGING SYSTEM

FIELD OF THE DISCLOSURE

The present disclosure generally relates to vehicle interiors. More specifically, the present disclosure relates to hammocks disposed within vehicle interiors.

BACKGROUND OF THE INVENTION

Automotive vehicles are commonly equipped with seating assemblies. In some cases, seating assemblies may be stowable within the vehicle, but the seating assemblies often do not allow for full reclined lounging of vehicle occupants.

SUMMARY OF THE INVENTION

According to a first aspect of the present disclosure, a vehicle interior system includes a seating assembly. The seating assembly includes a seatback pivotally coupled to a seat-base and is operable between a use position and a stowed position. An anchoring feature is disposed vehicle rearward of the seating assembly. A hammock is coupled to the anchoring feature and is configured to extend therefrom and attach to the seating assembly when the seating assembly is in the stowed position.

Embodiments of the first aspect of the present disclosure can include any one or a combination of the following features:
- the hammock is configured to attach to the seat-base of the seating assembly when the seating assembly is in the stowed position;
- the seat-base comprises a bottom side that generally faces vehicle downward when the seating assembly is in the use position and the hammock is configured to attach to the bottom side of the seat-base;
- the seating assembly is configured to tilt and tumble from the use position to the stowed position;
- the hammock is configured to be suspended between the anchoring feature and the seating assembly; and
- the vehicle interior system further comprises a retractor coupled to the hammock and disposed vehicle rearward of the seating assembly configured to retract the hammock.

According to a second aspect of the present disclosure, a vehicle interior system includes a first seating assembly. The first seating assembly includes a seatback pivotally coupled to the seat-base and is operable between a use position and a stowed position. A retractor is disposed vehicle rearward of the first seating assembly. A hammock is coupled to the retractor and operable between a retracted position, wherein the hammock is generally disposed about the retractor, and an unretracted position, wherein the hammock is extended outwardly from the retractor and is coupled to the first seating assembly.

Embodiments of the second aspect of the present disclosure can include any one or a combination of the following features:
- the retractor is disposed in a bulkhead of the vehicle interior;
- the retractor is disposed in a floor of the vehicle interior;
- the retractor is configured to retract the hammock from the unretracted position to the retracted position;
- the first seating assembly is in the stowed position when the hammock is in the unretracted position;
- the retractor comprises a spring-loaded roller; and
- the vehicle interior system further comprises a second seating assembly disposed vehicle rearward of the first seating assembly comprising a seat-base pivotally coupled to the seatback; and an anchoring feature disposed between the seat-base and the seatback of the second seating assembly, wherein the hammock is configured to be coupled to the anchoring feature while in the unretracted position.

According to a third aspect of the present disclosure, a vehicle interior system includes a floor. A seating assembly including a seatback and a floor-attachment feature coupled to a seat-base is operable between a use position, wherein the floor attachment feature is engaged with the floor, and a stowed position, wherein the floor-attachment feature is disengaged from the floor. A hammock is configured to attach to the seating assembly when the seating assembly is in the stowed position.

Embodiments of the third aspect of the present disclosure can include any one or a combination of the following features:
- the hammock is configured to attach to the seat-base of the seating assembly;
- the hammock is configured to attach to the floor-attachment feature of the seating assembly;
- the seating assembly is configured to lock in place while in the stowed position;
- the hammock is coupled to an anchoring feature disposed vehicle rearward of the seating assembly;
- the vehicle interior system further comprises a retractor coupled to the hammock and configured to retract the hammock, disposed vehicle rearward of the seating assembly; and
- the seating assembly is configured to provide a cushion at the vehicle forward end of the hammock while the seating assembly is in the stowed position.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4A is a side view of the seating assembly in the use position, according to one embodiment;

FIG. 4B is a side view of the seating assembly, illustrating the seat-base pivoted downward relative to the seatback, according to one embodiment;

DETAILED DESCRIPTION OF THE PREFERRED EMBODIMENTS

Figure 1:
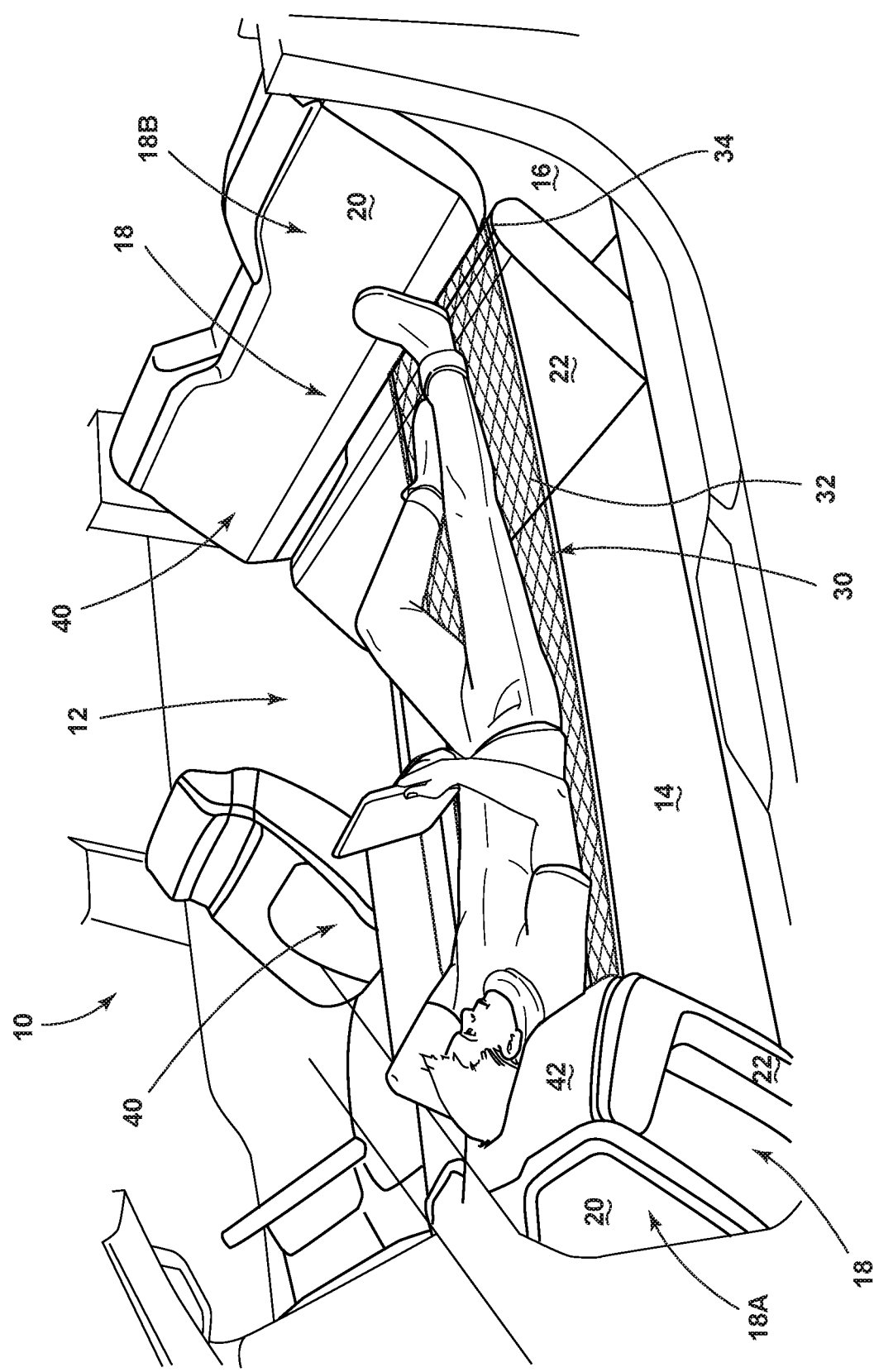
FIG. 1 is a perspective view of a vehicle interior, illustrating a hammock coupled between a seating assembly and an anchoring feature, according to one embodiment.

For purposes of description herein, the terms "upper," "lower," "right," "left," "rear," "front," "vertical," "horizontal," and derivatives thereof shall relate to the concepts as oriented in FIG. 1-7. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In reference to FIGS. 1-7, a vehicle 10 includes a seating assembly 18. The seating assembly 18 includes a seatback 20 pivotally coupled to a seat-base 22 and is operable between use and stowed positions. An anchoring feature 34 is disposed vehicle rearward of the seating assembly 18. A hammock 32 is coupled to the anchoring feature 34 and configured to extend therefrom and attach to the seating assembly 18 when the seating assembly 18 is in the stowed position.

Referring now to FIG. 1, the vehicle 10 is shown. The vehicle 10 may be at least one of a variety of vehicle types (e.g. car, SUV, van, sedan, truck, etc.). The vehicle 10 may include a vehicle interior 12. The vehicle interior 12 includes a floor 14. In some embodiments, in which the vehicle 10 is a truck, the vehicle interior 12 may include a bulkhead 16.

In various embodiments, the vehicle interior 12 may include the seating assembly 18. The seating assembly 18 may include a plurality of seating assemblies 18. The seating assemblies 18 may be arranged in rows 40. The rows 40 of seating assemblies 18 may be configured as bench seats and/or bucket seats. In some embodiments, at least one row 40 may include a first seating assembly 18A, and another row 40 may include a second seating assembly 18B disposed vehicle rearward of the first seating assembly 18A.

In some embodiments, the seating assembly 18 may be coupled to the floor 14. In some embodiments, the seating assembly 18 may be movably coupled to the floor 14. For example, the seating assembly 18 may move vehicle forward and rearward along a guide-channel of the floor 14. It is contemplated that, in some embodiments, the seating assembly 18 may move in various vehicle directions. In some examples, the seating assembly 18 may be coupled to the bulkhead 16 and/or the floor 14.

Figure 2C:
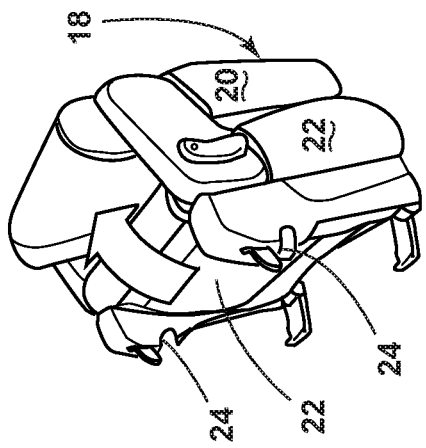
FIG. 2C is a side elevational view of the seating assembly in a stowed position, according to one embodiment.
Figure 2B:
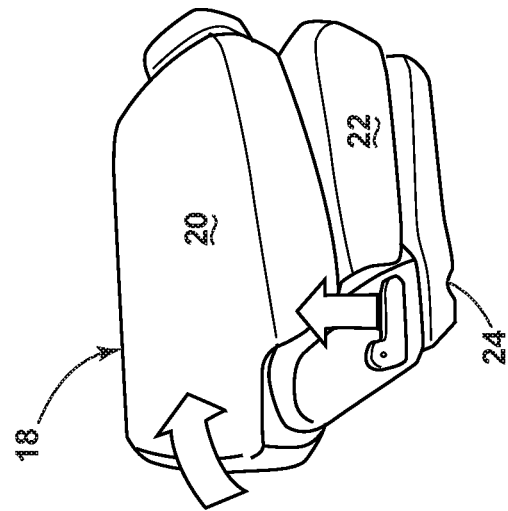
FIG. 2B is a side elevational view of the seating assembly, illustrating a seatback of the seating assembly pivoted to a forwardly folded position over a seat-base of the seating assembly, according to one embodiment.
Figure 2A:
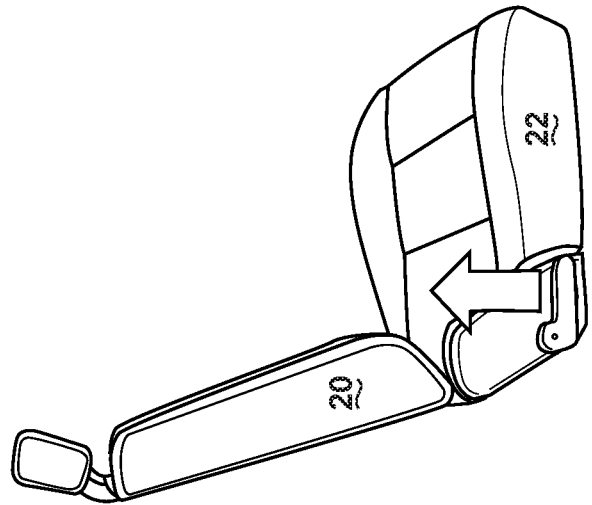
FIG. 2A is a side elevational view of the seating assembly in a use position, according to one embodiment.

Referring now to FIGS. 2A-2C, the seating assembly 18 may include a seatback 20 coupled to a seat-base 22. In some embodiments, the seatback 20 may be pivotally coupled to the seat-base 22. The seat-base 22 may include a bottom side 22A. In some embodiments, the bottom side 22A may be coupled to the floor 14. In some embodiments, the seat-base 22 may include a floor-attachment feature 24. In some embodiments, the bottom side 22A may include the floor-attachment feature 24. The floor-attachment feature 24 may be configured to couple the seating assembly 18 to the floor 14 of the vehicle 10. In some embodiments, the floor-attachment feature 24 may movably couple the seating assembly 18 to the floor 14. For example, the floor-attachment feature 24 may be coupled to a guide-channel of the floor 14 and slide there-along. In some embodiments, the floor-attachment feature 24 may be configured to detach from the floor 14, such that the floor-attachment feature 24 is not directly coupled to the floor 14. For example, in some embodiments, the floor-attachment feature 24 may go from being engaged with the floor 14, as shown in FIGS. 2A and 2B, to being disengaged from the floor 14, as shown in FIG. 2C. It is contemplated that the floor-attachment feature 24 may include at least one of a host of features configured to couple the seating assembly 18 to the floor 14 of the vehicle 10 (e.g., a latch that corresponds to a cleat of the floor 14, etc.).

In reference to FIGS. 2A-5, the seating assembly 18 may be operable between use and stowed positions. As shown in FIG. 2A, the bottom side 22A of the seat-base 22 may generally face the floor 14, when the seating assembly 18 is in the use position. In other words, the bottom side 22A may generally face vehicle downward when the seating assembly 18 is in the use position. In various embodiments, the seating assembly 18 may move between the use and stowed position in at least one of a host of ways that includes, but is not limited to, pivoting the seatback 20 relative to the seat-base 22, pivoting the seat-base 22 relative to the seatback 20, sliding the seat-base 22 along the floor 14 of the vehicle 10, disengaging the floor-attachment feature 24 from the floor 14, pivoting the seating assembly 18 such that the bottom side 22A of the seat-base 22 faces a different vehicular direction, locking the seating assembly 18 in at least one of a variety of positions, and/or a combination thereof.

In some embodiments, the seating assembly 18 may tilt and tumble from the use position to the stowed position as shown in FIGS. 2A-2C. In other words, the seating assembly 18 may start in the use position, as shown in FIG. 2A, and move to the stowed position by (1) pivoting the seatback 20 forward relative to the seat-base 22, as shown in FIG. 2B, (2) at least partially disengaging the seat-base 22 and/or the floor-attachment feature 24 from the floor 14, and then (3) pivoting both the seat-base 22 and the seatback 20, such that the direction that the bottom side 22A of the seat-base 22 faces changes relative to the floor 14 of the vehicle 10, as shown in FIG. 2C. In some embodiments, in which the seating assembly 18 tilts and tumbles to the stowed position, the seating assembly 18 may be configured to lock in place while in the stowed position. It is contemplated that the seating assembly 18 may be locked in the stowed position by at least one of a variety of devices (e.g., stop, detent, etc.).

Figure 3B:
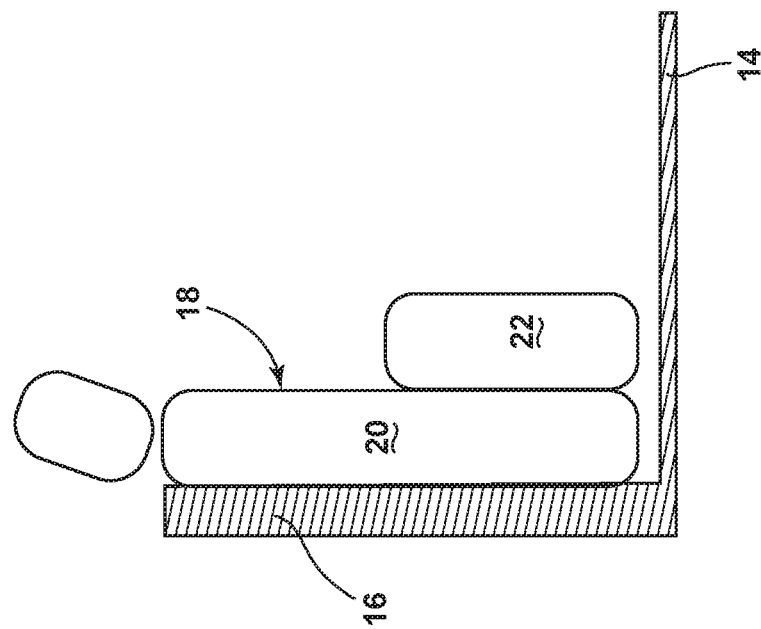
FIG. 3B is a side view of the seating assembly, illustrating the seat-base pivoted upward toward the seatback, according to one embodiment.
Figure 3A:
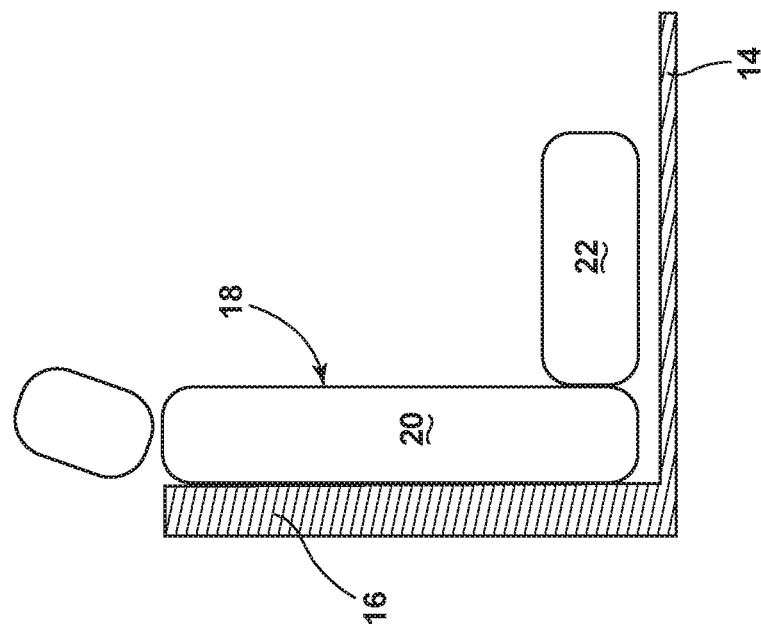
FIG. 3A is a side view of the seating assembly in the use position, according to one embodiment.

In some embodiments, the seating assembly 18 may move between the use position and the stowed position by pivoting the seat-base 22 relative to the seatback 20. For example, in some embodiments, the seating assembly 18 may start in the use position, as shown in FIG. 3A, and move to the stowed position by pivoting the seat-base 22 vehicle upward, as shown in FIG. 3B. Further, in some embodiments, the seating assembly 18 may start in the use position, as shown in FIG. 4A, and move to the stowed position by pivoting the seat-base 22 vehicle downward, as shown in FIG. 4B.

Figure 5:
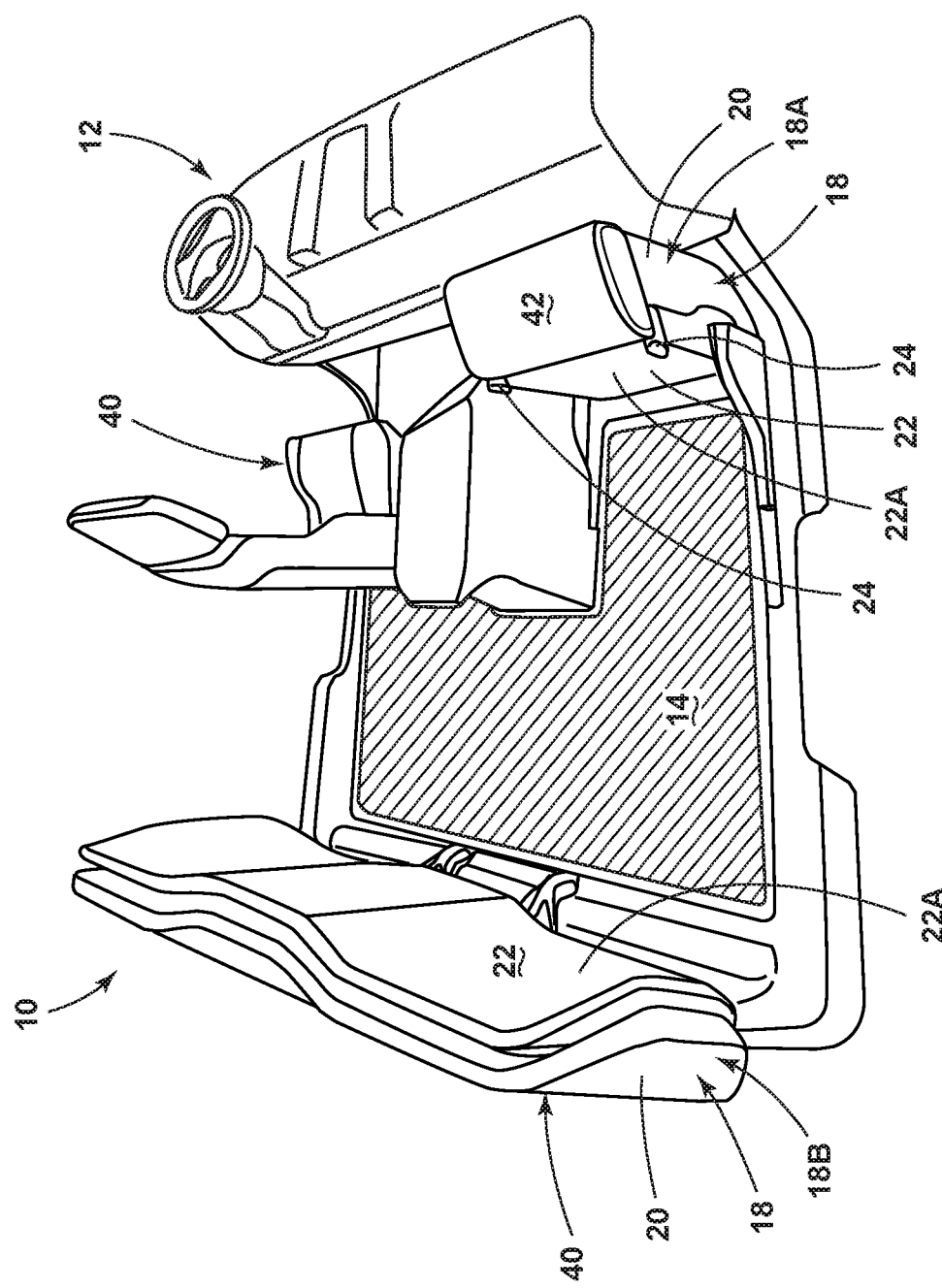
FIG. 5 is a perspective view of the vehicle interior, illustrating the seating assemblies in stowed positions, according to one embodiment.

Referring now to FIG. 5, it is contemplated that, in some embodiments, various seating assemblies 18 within the vehicle interior 12 may move from the use position to the stowed position in different ways. For example, in some embodiments, the first seating assembly 18A may tilt and tumble from the use position to the stowed position, while the second seating assembly 18B, which is disposed vehicle rearward of the first seating assembly 18A, may move to the stowed position by pivoting the seat-base 22 upwards relative to the seatback 20, as shown in FIG. 5.

Figures 6A, 6B:
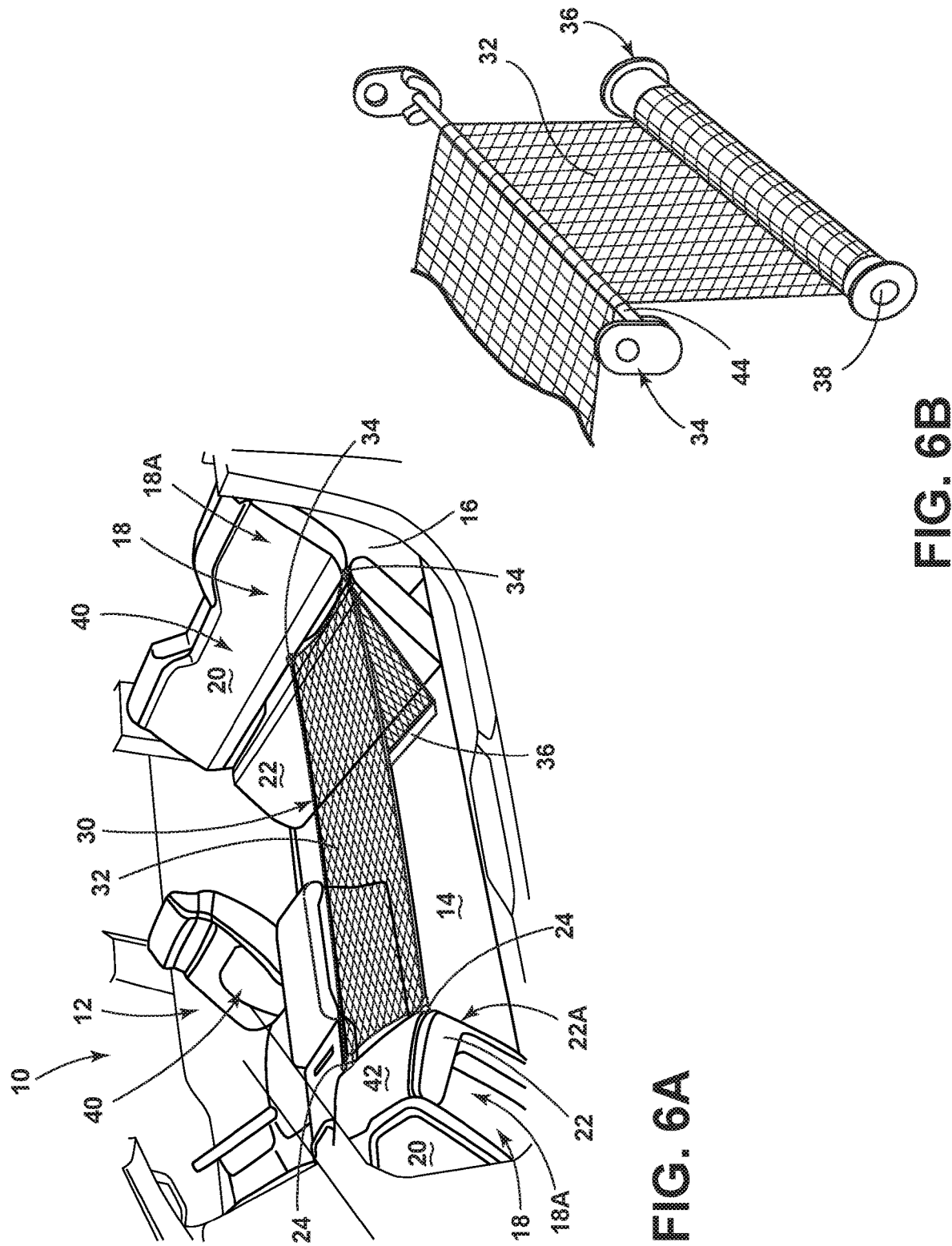
FIG. 6A is a perspective view of the vehicle interior, illustrating the hammock coupled between the seating assembly and the anchoring feature, according to one embodiment.
FIG. 6B is a elevational view of a retractor, illustrating the hammock partially retracted about the retractor.
Figure 7:
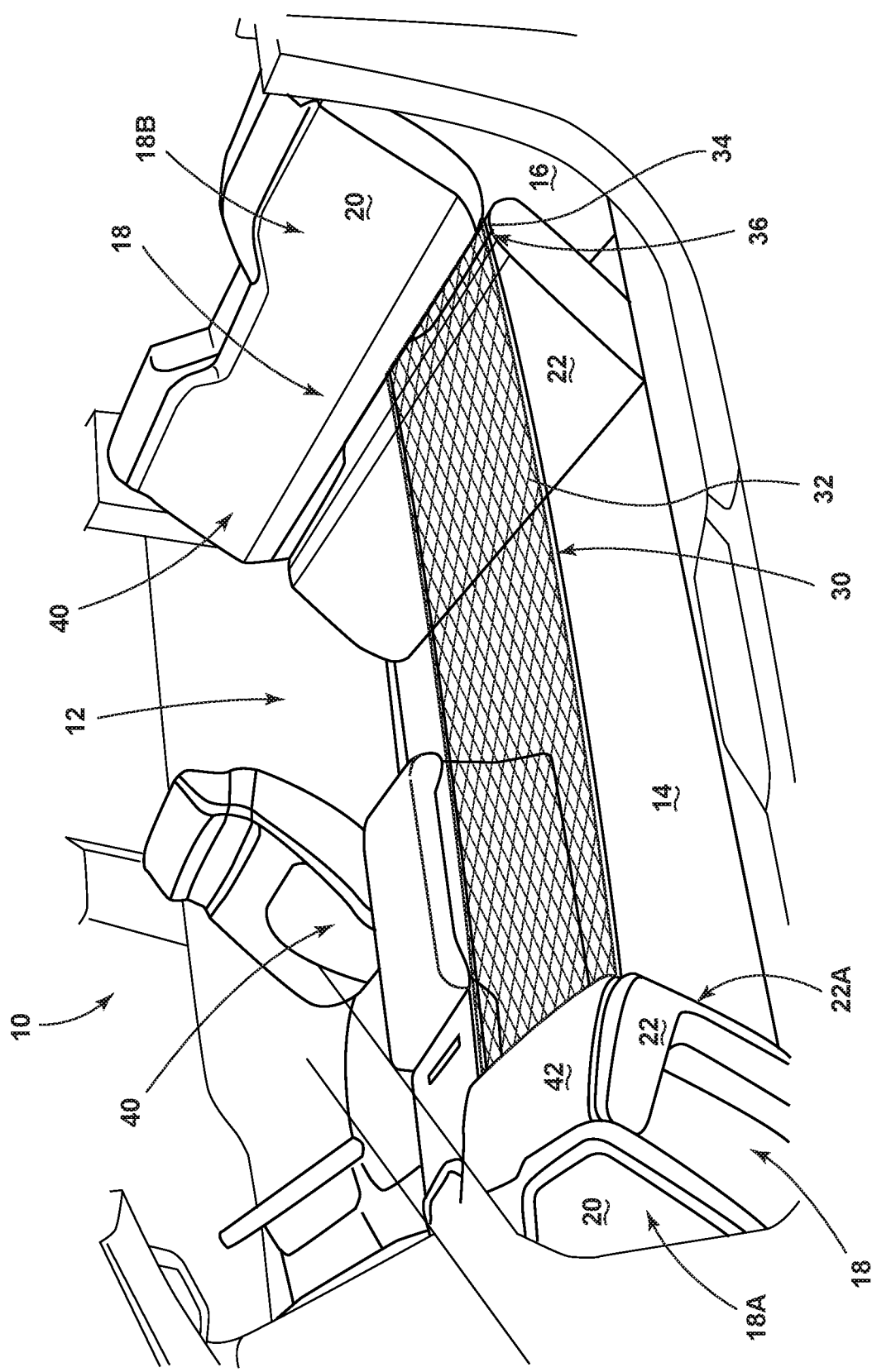
FIG. 7 is a perspective view of the vehicle, illustrating the hammock suspended between the anchoring feature and the seating assembly disposed vehicle forward of the anchoring feature.

Referring now to FIGS. 6A-7, the vehicle interior 12 may include a hammock assembly 30. The hammock assembly 30 may include the hammock 32, the anchoring feature 34, a retractor 36 and/or the seating assembly 18. In various embodiments, the hammock 32 may be configured to extend between the anchoring feature 34 and the seating assembly 18. It is contemplated that the hammock 32 may be made of at least one of a host of materials that includes, but is not limited to, webbing, netting, mesh, canvas, polyester, plastic, nylon, and/or a combination thereof.

As shown in FIG. 6A, the anchoring feature 34 may be configured to support the hammock 32. In other words, the anchoring feature 34 may be configured to uphold a portion of the hammock 32, such that it may be suspended between the anchoring feature 34 and the seating assembly 18. In various embodiments, the anchoring feature 34 may be disposed vehicle rearward of the seating assembly 18. In some embodiments, the anchoring feature 34 may be coupled to and/or integral with the bulkhead 16 of the vehicle 10. In some embodiments, in which the hammock 32 is configured to be suspended between the first seating assembly 18A and the anchoring feature 34, the anchoring feature 34 may be coupled to and/or integral with the second seating assembly 18B, which is disposed vehicle rearward of the first seating assembly 18A. In some embodiments, the anchoring feature 34 may be disposed between the seatback 20 and seat-base 22 of the second seating assembly 18B, as shown in FIG. 6A.

Referring now to FIGS. 6A and 6B, it is contemplated that the anchoring feature 34 may include at least one of a variety of devices suitable for supporting the suspended hammock 32. For example, in some embodiments, the anchoring feature 34 may include hooks and/or clips configured to engage with the hammock 32. As shown in FIG. 6B, in some embodiments, the anchoring feature 34 may include a rigid bar 44 configured to support the hammock 32. The rigid bar 44 may be integrally coupled with vehicle 10 or operably coupled, such that it may be placed in position when needed.

Referring now to FIGS. 6A and 7, in various embodiments, the hammock 32 may extend from the anchoring feature 34 and attach to the seating assembly 18 vehicle forward of the anchoring feature 34. In some embodiments, the hammock 32 may attach to the seat-base 22 and/or the bottom side 22A of the seat-base 22. In some embodiments, the hammock 32 may attach to the floor-attachment feature 24 when the floor-attachment feature 24 is disengaged from the floor 14. In various embodiments, the hammock 32 may be configured to attach to the seating assembly 18, the seat-base 22, the bottom side 22A, the floor-attachment feature 24, and/or a combination thereof, when the seating assembly 18 is in the stowed position. It is contemplated that, in some embodiments, the hammock 32 may be configured to attach to the seatback 20 of the seating assembly 18. It is further contemplated that the hammock 32 may attach to the seating assembly 18 by utilizing any one of a variety of coupling features (e.g., clips, hooks, etc.).

Referring now to FIGS. 6A and 6B, the hammock assembly 30 may include a retractor 36 coupled to the hammock 32 and configured to retract the hammock 32. In some embodiments, the retractor 36 may include a spring-loaded roller 38, as shown in FIG. 6B. The spring-loaded roller 38 may be configured to retract the hammock 32 due to tension that biases the spring-loaded roller 38 to wrap or wind the hammock 32 about the spring-loaded roller 38. It is contemplated that the retractor 36 may include at least one of a host of devices configured to retract the hammock 32.

The retractor 36 may be disposed vehicle rearward of the seating assembly 18 from which the hammock 32 is configured to be suspended from. In some embodiments, the retractor 36 may be coupled to and/or within the bulkhead 16 of the vehicle 10. In some embodiments, the retractor 36 may be coupled to and/or disposed within the floor 14 of the vehicle 10. In some embodiments, in which the hammock 32 is configured to be coupled to the first seating assembly 18A, the retractor 36 may be coupled to and/or disposed within the second seating assembly 18B located vehicle rearward of the first seating assembly 18A. In some embodiments, the retractor 36 may be the anchoring feature 34.

In various embodiments, the hammock 32 may be operable between a retracted position and an unretracted position. While in the retracted position, the hammock 32 may be generally disposed about the retractor 36. In some embodiments, the hammock 32 may be majorly, substantially, and/or completely wound or wrapped around the retractor 36 while in the retracted position. In various embodiments, the hammock 32 may be extended outwardly from the retractor 36 while in the unretracted position. In some embodiments, the hammock 32 may be extended outwardly from the retractor 36 and coupled to the seating assembly 18 vehicle forward of the retractor 36 while in the unretracted position. In some embodiments, the hammock 32 may be in the unretracted position when the hammock 32 is extended outwardly from the retractor 36 and attached to the seating assembly 18, the seat-base 22, the bottom side 22A of the seat-base 22, and/or the floor-attachment feature 24.

In operation, an occupant of the vehicle 10 may first move the seating assembly 18 from the use position to the stowed position. Next, the occupant may extend the hammock 32 outwardly from the retractor 36 and attach the hammock 32 to the stowed seating assembly 18. In some examples, in which the retractor 36 is not the anchoring feature 34, the occupant may additionally couple the hammock 32 to the anchoring feature 34, such that the hammock 32 may be suspended between the stowed seating assembly 18 and the anchoring feature 34. In some examples, the hammock 32 may extend out of the retractor 36 between the seat-base 22 and the seatback 20 of the second seating assembly 18B and attach to the stowed first seating assembly 18A, which is disposed vehicle forward of the second seating assembly 18B, as depicted in FIG. 7.

Use of the present disclosure may provide a variety of advantages. First, the hammock assembly 30 may provide a suitable environment for an occupant to lounge. Second, when the seating assembly 18 is locked in the tilt and tumble stowed position, the seating assembly 18 may be configured to provide a cushion 42 at the vehicle forward end of the hammock 32 that may increase the comfort of an occupant lounging in the hammock 32. Third, the hammock 32 may be utilized to secure cargo in place within the vehicle interior 12. Fourth, in some examples, the retractor 36 may increase the ease of setting up the hammock assembly 30.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle interior system, comprising:
   a seating assembly comprising a seatback pivotally coupled to a seat-base and operable between use and stowed positions;
   an anchoring feature disposed vehicle rearward of the seating assembly; and
   a hammock coupled to the anchoring feature and configured to extend therefrom and attach to the seating assembly when the seating assembly is in the stowed position.

2. The vehicle interior system of claim 1, wherein the hammock is configured to attach to the seat-base of the seating assembly when the seating assembly is in the stowed position.

3. The vehicle interior system of claim 2, wherein the seat-base comprises:
   a bottom side that generally faces vehicle downward when the seating assembly is in the use position; and
   the hammock is configured to attach to the bottom side of the seat-base.

4. The vehicle interior system of claim 1, wherein the seating assembly is configured to tilt and tumble from the use position to the stowed position.

5. The vehicle interior system of claim 1, wherein the hammock is configured to be suspended between the anchoring feature and the seating assembly.

6. The vehicle interior system of claim 1, further comprising:
   a retractor coupled to the hammock and disposed vehicle rearward of the seating assembly configured to retract the hammock.

7. A vehicle interior system, comprising:
   a first seating assembly, comprising a seatback pivotally coupled to a seat-base and operable between use and stowed positions;
   a retractor disposed vehicle-rearward of the first seating assembly; and
   a hammock coupled to the retractor and operable between a retracted position, wherein the hammock is generally disposed about the retractor, and an unretracted position, wherein the hammock is extended outwardly from the retractor and coupled to the first seating assembly in the stowed position.

8. The vehicle interior system of claim 7, wherein the retractor is disposed in a bulkhead of the vehicle interior.

9. The vehicle interior system of claim 7, wherein the retractor is disposed in a floor of the vehicle interior.

10. The vehicle interior system of claim 7, wherein the retractor is configured to retract the hammock from the unretracted position to the retracted position.

11. The vehicle interior system of claim 7, wherein the retractor comprises a spring-loaded roller.

12. The vehicle interior system of claim 7, further comprising:
a second seating assembly disposed vehicle rearward of the first seating assembly, comprising a seat-base pivotally coupled to a seatback; and
an anchoring feature disposed between the seat-base and the seatback of the second seating assembly, wherein the hammock is configured to be coupled to the anchoring feature while in the unretracted position.

13. A vehicle interior system, comprising:
a floor;
a seating assembly comprising a seatback and a floor-attachment feature coupled to a seat-base;
the seating assembly being operable between a use position, wherein the floor-attachment feature is engaged with the floor, and a stowed position, wherein the floor-attachment feature is disengaged from the floor;
an anchoring feature spaced apart from the seating assembly; and
a hammock configured to extend between the seating assembly and the anchoring feature when the seating assembly is in the stowed position.

14. The vehicle interior system of claim 13, wherein the hammock is configured to attach to the seat-base of the seating assembly.

15. The vehicle interior system of claim 14, wherein the hammock is configured to attach to the floor-attachment feature of the seating assembly.

16. The vehicle interior system of claim 13, wherein the seating assembly is configured to lock in place while in the stowed position.

17. The vehicle interior of claim 13, wherein the anchoring feature is disposed vehicle rearward of the seating assembly.

18. The vehicle interior system of claim 13, further comprising:
a retractor coupled to the hammock and configured to retract the hammock, disposed vehicle rearward of the seating assembly.

19. The vehicle interior system of claim 13, wherein the seating assembly is configured to provide a cushion at a vehicle forward end of the hammock while the seating assembly is in the stowed position.

* * * * *